United States Patent [19]
Silver

[11] Patent Number: 6,067,379
[45] Date of Patent: *May 23, 2000

[54] METHOD AND APPARATUS FOR LOCATING PATTERNS IN AN OPTICAL IMAGE

[75] Inventor: William M. Silver, Medfield, Mass.

[73] Assignee: Cognex Corporation, Natick, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/747,476

[22] Filed: Nov. 12, 1996

Related U.S. Application Data

[63] Continuation of application No. 08/240,079, May 9, 1994, Pat. No. 5,717,785, which is a continuation of application No. 07/282,241, Dec. 9, 1988, Pat. No. 4,921,002.

[51] Int. Cl.$^7$ ..................................................... G06K 9/64
[52] U.S. Cl. ........................................... 382/216; 382/151
[58] Field of Search ..................................... 382/181, 209, 382/216, 218, 217, 151

[56] References Cited

U.S. PATENT DOCUMENTS

| | | |
|---|---|---|
| 3,816,722 | 6/1974 | Sakoe et al. . |
| 3,936,800 | 2/1976 | Ejiri et al. . |
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. ........................ 382/151 |
| 4,183,013 | 1/1980 | Agrawala et al. . |
| 4,200,861 | 4/1980 | Hubach et al. .......................... 382/218 |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |

(List continued on next page.)

FOREIGN PATENT DOCUMENTS

| | | |
|---|---|---|
| 0 527 632 A2 | 2/1993 | European Pat. Off. . |
| WO 95/122137 | 8/1995 | WIPO . |
| WO 95/21376 | 8/1995 | WIPO . |
| WO 97/21189 | 6/1997 | WIPO . |
| WO 97/22858 | 6/1997 | WIPO . |
| WO 97/24692 | 7/1997 | WIPO . |
| WO 97/24693 | 7/1997 | WIPO . |

OTHER PUBLICATIONS

Grimson, W. Eric L.and Huttenlocher, Daniel P., "On the Sensitivity of the Hough Transform for Object Recognition", May 1990, IEEE Transactions on Pattern Analysis and Machine Intelligence, vol. 12, No. 3.

Medina–Mora et al. (1981) An Incremental Programming Environment, IEEE Transactions on Software Eng. SE–7:472–482.

Teitelbaum et al. (19810 The Cornell Program Synthesizer: A Syntax–Directed Programming Environment Communications of the ACM 24:563–573.

(List continued on next page.)

*Primary Examiner*—Amelia Au
*Assistant Examiner*—Larry J. Prikockis
*Attorney, Agent, or Firm*—David J. Powsner

[57] ABSTRACT

The invention provides methods and apparatus for processing an image to identify the position of a linear pattern—for example, a line or a cross-hair comprising a plurality of intersecting lines. The system performs a first processing step for generating a projection of the image along axes aligned with an expected position of the linear patterns. A second processing step performs a mirror symmetry filtering on the projection to bring out a single peak corresponding to the center of the linear pattern. To further isolate that peak, the system performs a further filtering operation to remove peaks of lesser slope angle, so that only a highly sloped spike corresponding to the linear pattern will remain. The position of the center that peak corresponds to the center of the linear pattern in the original input signal.

15 Claims, 6 Drawing Sheets

U.S. PATENT DOCUMENTS

| | | |
|---|---|---|
| 4,534,813 | 8/1985 | Williamson et al. . |
| 4,541,116 | 9/1985 | Lougheed . |
| 4,570,180 | 2/1986 | Baier et al. . |
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,783,826 | 11/1988 | Koso . |
| 4,783,828 | 11/1988 | Sadjadi . |
| 4,783,829 | 11/1988 | Miyakawa et al. . |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,475,766 | 12/1995 | Tsuchiya et al. . |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |

OTHER PUBLICATIONS

Newsletter from Acquity Imaging, Inc., "Remote Vision Support Package–The Phones Are Ringing!," 1 page.

PictureTel Corporation Product Brochure "Picturetel Live PCS 100(tm) Personal Visual Communications System," 3 pp. (1993).

PictureTel Corporation Product Brochure "Picturetel System 1000: Complete Videoconferencing for Cost Sensitive Applications," 4 pp. (1993).

PictureTel Corporation Product Brochure, "Picturetel System 4000(tm) A Family of Models to Fit your Application from Offices to Boardrooms, Classrooms, and Auditoriums," 4 pp. (1993).

Symantec Corporation, "The Norton pcAnywhere User's Guide," Table of Contents 8 pp; Introduction to pcAnywhere Technology pp i–vii; Chapter 7–Sessions; pp. 191–240 (1991).

Bursky, Dave, "CMOS Four–Chip Set Process Images at 20–MHz Data Rates,," Electronic design, May 28, 1987, pp. 39–44.

Plessey Semiconductors, Preliminary Information, May 1986, Publication No. PS2067, May 1986, pp. 1–5.

NEC Electronics Inc., PD7281 Pipelined Processor, Product Information Brochure, pp. 2–169–2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

METHOD AND APPARATUS FOR LOCATING PATTERNS IN AN OPTICAL IMAGE

This application is a continuation of application Ser. No. 08/240,079, filed May 9, 1994, now U.S. Pat. No. 5,717,785 issued Feb. 10, 1998, which is a continuation of application Ser. No. 07/282,241 filed Dec. 9, 1988 now U.S. Pat. No. 4,921,002 issued May 1, 1990.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to machine vision, and more particularly, to methods and apparatus for accurately locating linear patterns, e.g., a cross-hairs, in an optical image.

BACKGROUND

Automated product assembly and manufacturing processes often rely on machine vision to determine the position of a component being processed. Typically, a linear pattern, such as a cross-hair, is used as a reference point for precision alignment.

Various methods of machine vision positioning are currently practiced. Among the primary ones are variations on the general Hough transform and correlation (template matching). With respect to the latter, there exists binary exclusive-OR correlation and, more recently, gray-scale normalized correlation. One common element of these prior art methods is that they require, as input, an image template of the pattern they are to locate.

As a component undergoes various stages of assembly or manufacture, the appearance of the alignment pattern may change. For example, etching and masking of a semiconductor wafer can alter the contrast, definition and thickness of cross-hairs embedded in the wafer. Thus, in order to be effective during the entire assembly process, the prior art methods typically require many image templates. Unfortunately, the actual appearance of a locating pattern on a component is not always predictable, frustrating even the use of multiple ideal template images.

A further drawback of prior art systems is that they consume excessive time in comparing actual optical images to the multiple template images.

In view of the foregoing, an object of the invention is to provide an improved vision system and, more particularly, improved methods and apparatus for accurately locating the center of a linear pattern, e.g., a line or a cross-hair, in an optical image.

Still another object of the invention is to provide a machine vision positioning system that does not rely on an object template in order to position a piece.

Yet another object of the invention is to provide a system capable of positioning a component notwithstanding changes in its appearance during processing.

SUMMARY OF THE INVENTION

The aforementioned objects are attained by the invention, which provides machine vision methods and apparatus capable of quickly and accurately locating linear patterns, such as lines, or cross-hairs made up of intersecting lines, on a component.

In one aspect, the invention provides an apparatus for processing a component image to identify the position of a linear pattern thereon. The apparatus includes a first processing element for generating a projection of the image along an axis substantially aligned with an expected orientation of the linear pattern. As described further below, a projection is essentially a one-dimensional "profile" of the input image.

If a linear pattern in the image is aligned with the projection axis, edges of that pattern will correspond with peaks on an otherwise flat, or substantially flat, profile. An apparatus according to the invention further includes a processing element for performing "mirror symmetry" filtering on the projection. That filtering relies on the symmetry of the edge peaks to bring out a single peak corresponding to the center of the linear pattern.

To isolate that center peak, the apparatus includes a notch detection element that operates on the mirror symmetry filter output to filter out lesser peaks of low slope angle, so that only a highly sloped spike corresponding to the linear pattern of interest will remain.

The center of that peak corresponds to the center of the linear pattern in the original input signal. The apparatus, accordingly, includes a peak finding element that determines the location of the peak center. To improve accuracy of that determination, the apparatus can interpolate a peak position from the apparent peak and the two neighboring points on opposite sides of that apparent peak.

An apparatus of the type described above can determine the location of a line in an input image, e.g., a "street" in a semiconductor wafer. Alternatively, it can to locate a single "hair" of a cross-hair pattern.

The invention accordingly provides, in another aspect, an apparatus for locating the center of a cross-hair, made up of intersecting lines, contained in an input image. That apparatus is constructed and operated as described above, and is additionally adapted to take projections along two axes, each of which is aligned with an expected orientation of the corresponding hairs. That apparatus also performs mirror symmetry and notch-detection filtering on both projections to permit location of the centers of each hair. The center of the cross-hair is, then, determined to lie at the intersection of the hairs.

In still other aspects, the invention provides methods for linear pattern location corresponding to the operation of the apparatus described above.

As will be appreciated from this summary, and from the subsequent detailed description, features of the invention include its ability to locate linear patterns without matching them with image templates, as otherwise required in the prior art. Another feature of the invention is its ability to detect very low contrast linear patterns and pattern edges. This results, in part, from the use of projections which greatly enhance the signal-to-noise ratio of the image signal. Moreover, the invention demands two-dimensional processing only for the generation of projections, utilizing single-dimensional processing for all other sophisticated operations.

BRIEF DESCRIPTION OF THE DRAWINGS

Other features, objects and benefits of the invention can be more clearly understood with reference to the following description of an illustrative embodiment, and to the drawings, in which.

DETAILED DESCRIPTION OF THE ILLUSTRATED EMBODIMENT

Figure 1:
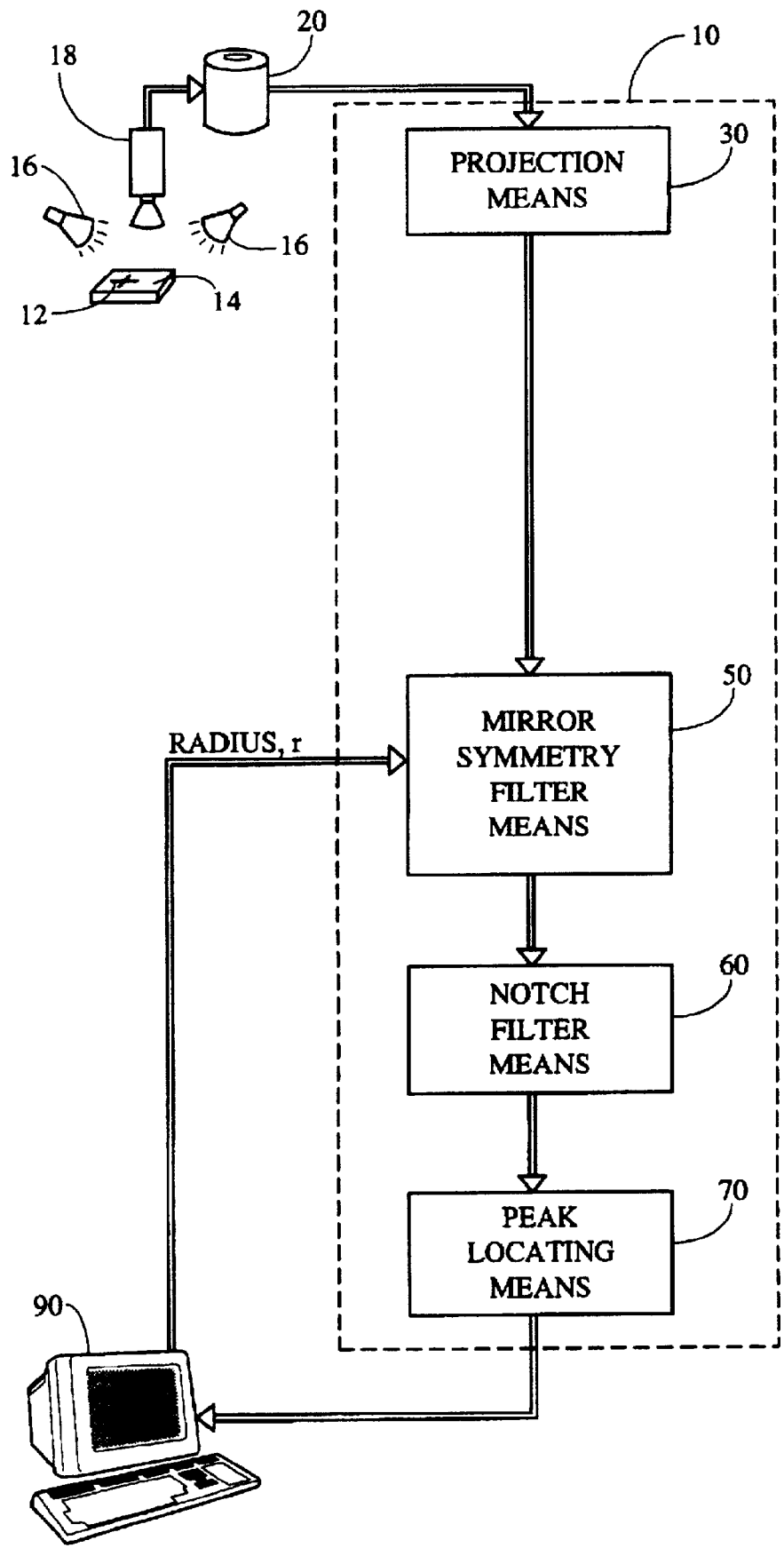
FIG. 1 is a schematic representation of a preferred embodiment of an apparatus according to the invention.
Figure 2:
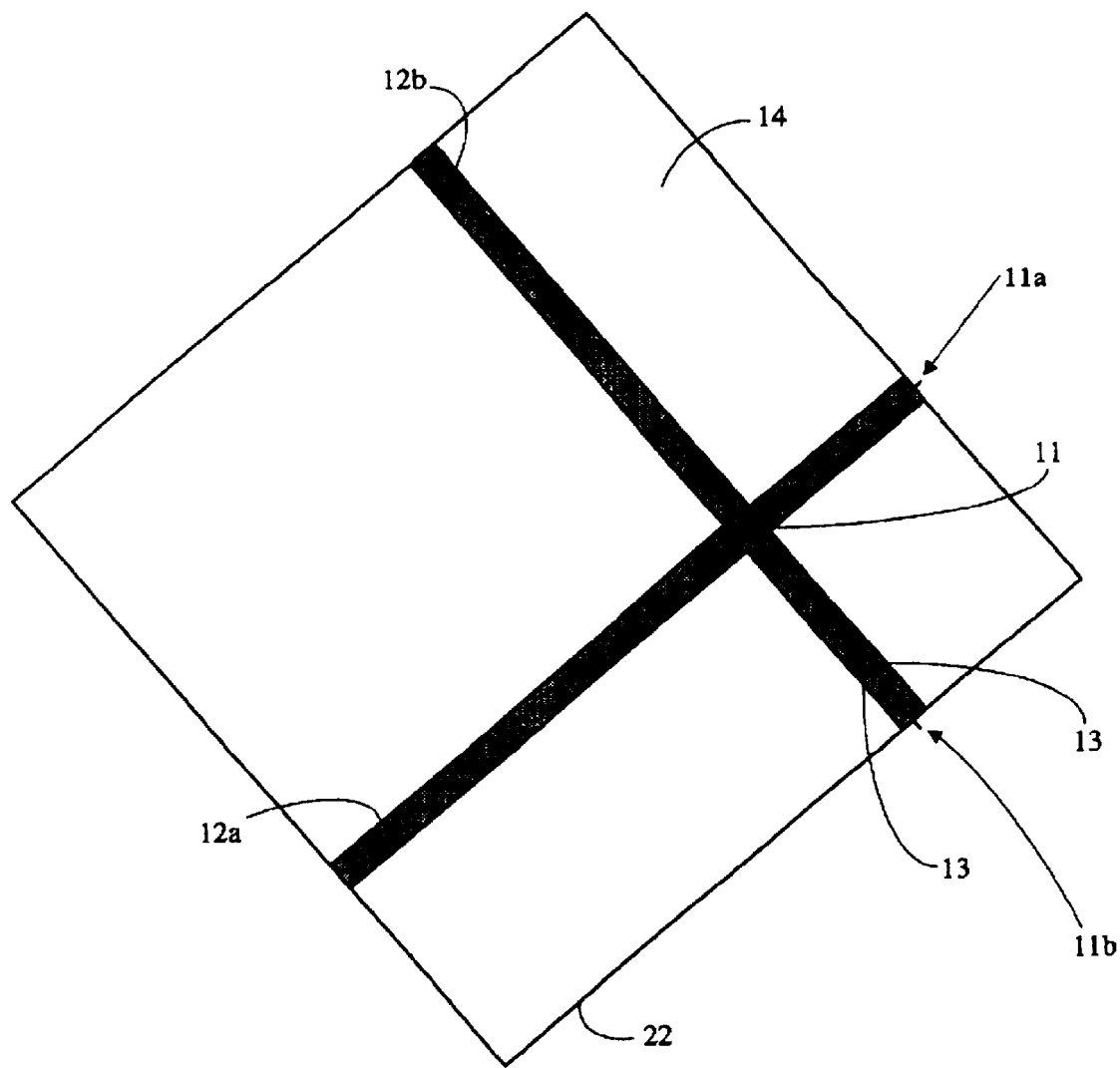
FIG. 2 is a perspective view of a linear pattern on a surface.

With reference now to FIGS. 1 and 2, a schematic representation of an apparatus 10 for accurately locating a cross-hair 12, comprising intersecting linear patterns 12a, 12b is shown on a surface 14.

The surface 14 is illuminated, for example, by lamps 16 to facilitate the creation of an image signal by a video camera 18. The output of that camera is electrically connected to an optional storage device 20 that can store the image prior to processing. As shown in the illustration, the output of storage device 20 is routed to a projection element 30, which performs the first stage of location processing, as discussed below.

Video camera 18, lamps 16, and storage device 20 operate and are configured in a manner conventional in the art.

Figure 3:
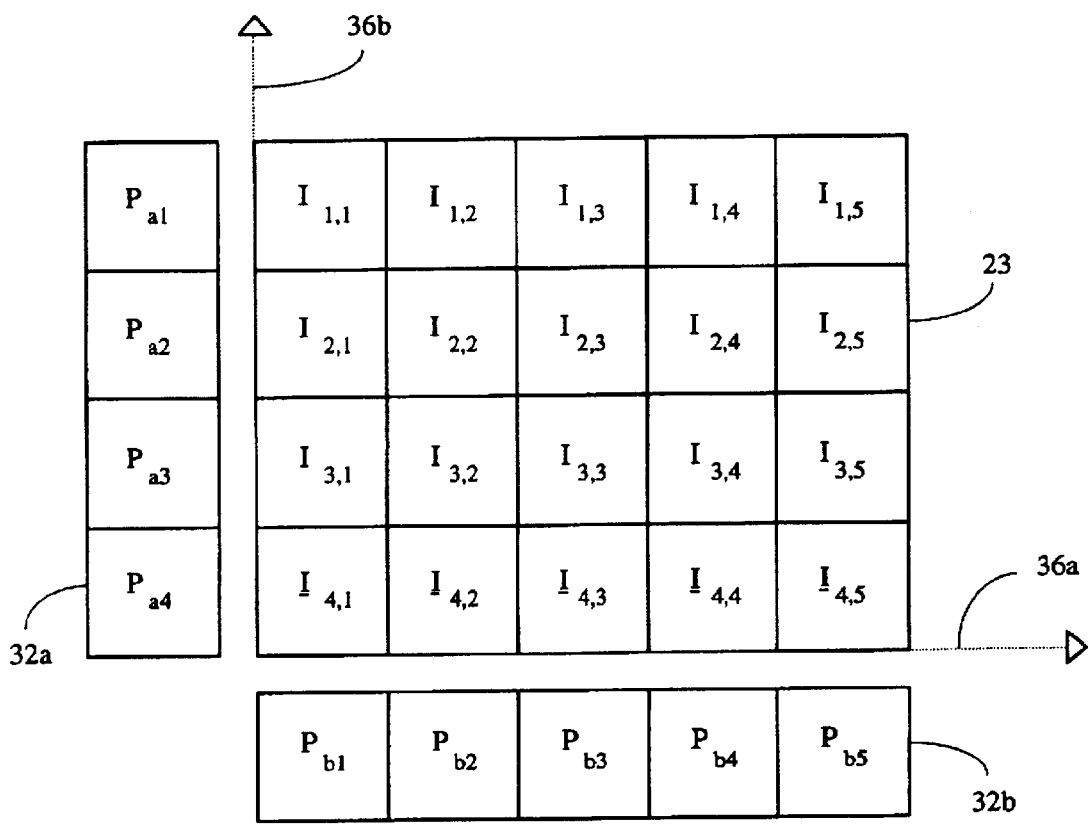
FIG. 3 is a planar view of a representative segment of an image signal and corresponding projections.

A digital image signal 22 output by camera 18 is made up of individual pixels, $I_{x,y}$. A representative portion 23 of an image signal 22 is illustrated in FIG. 3, showing pixels designated $I_{1,1}, I_{1,2} \ldots I_{4,5}$.

The projection element 30 sums pixels along directions parallel to axes 36a, 36b corresponding to the expected orientation of the linear patterns 12a, 12b to be inspected. For example, if the linear patterns are oriented with the pixel grid itself, the projection summations are conducted along the grid's rows and columns; otherwise, they are conducted in appropriate directions. The projection element generates, for those sums, projection signals 32a, 32b, respectively.

The aforementioned projection signals can be generated in a manner conventional in the art. Preferably, they are generated in accord with the techniques revealed in U.S. Pat. No. 4,972,359, assigned to the assignee hereof. A software listing of a more preferred implementation of projection element 30 is provided in Appendix A, filed herewith.

By way of example, illustrated projection signal 32a includes elements $Pa_1$ through $Pa_4$, generated in accord with the following mathematical function (which assumes that the pixel grid is aligned with the axes 36a, 36b).

$$Pa_i = \sum_{n=1}^{5} I_{i,n} \quad \text{Eq. 1}$$

Projection signal 32b, including elements $Pb_1$ through $Pb_5$, is generated by a like formula.

As noted above, each projection signal 32 provides a profile of the image signal 22 in a direction parallel to the corresponding axis. Thus, the linear pattern aligned with the axis is emphasized, while image "noise" is effectively averaged out.

For sake of simplicity, the discussion which follows focuses on processing of a projection signal corresponding to a single linear pattern, e.g., "hair" 12a of cross-hair 12. It will be appreciated that, in order to determine the location of cross-hair 12, like processing is performed on the other "hair" 12b.

Figure 4A:
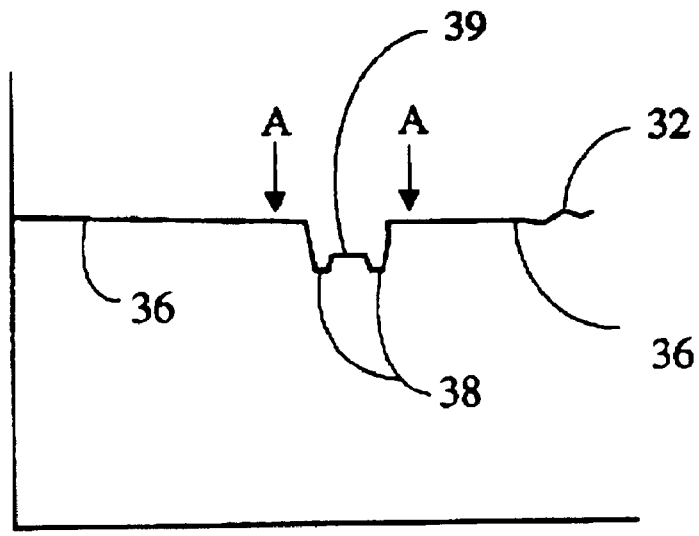
FIG. 4a is a plot of a projection signal.

An exemplary projection signal 32 is illustrated in FIG. 4a, where three features of interest are shown: the portions 36, corresponding to the average background intensity value of the image scene; the portion 39 corresponding to the average intensity value of the central region of the linear pattern or "hair"; and the portion 38, corresponding to the average intensity of the boundary between the linear feature and the background. It will be appreciated that the features 38 and 39 can be relatively brighter than, darker than, or equal to, the background 36, in any combination. It will be further appreciated, however, that features 38 and 39 cannot both be equal to the background, because the pattern would not be detectable. Further fluctuation in the illustrated projection signal 32 is due, for example, to noise in the image signal 22.

Figure 4B:
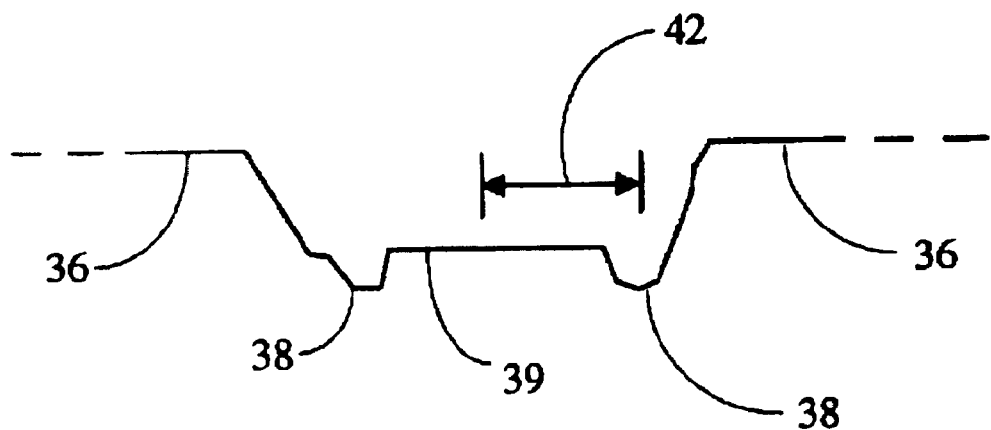
FIG. 4b is a detail of the plot of a projection signal taken along lines A—A.

The image processor 10 performs further processing on the projection signal in order to provide an accurate indication of the location of the center of the linear pattern 12a on the surface 14. Particularly, referring to FIG. 1, exemplary projection signal 32 is processed by mirror symmetry filter element 50, using an input radius r, to derive a peak corresponding to the center of the pattern 12a. The radius, r, represents one-half of the expected width of the linear pattern, and is illustrated as 42 of FIG. 4b.

The radius r is input, for example, by the user, e.g., via console 90. The value of radius r is selected to accommodate the expected variation of thickness in the linear pattern caused by, for example, processing of the underlying component. While the exact value of the radius, r, is not critical, it is preferably selected to be slightly larger than the largest expected half-width of the linear pattern.

Mirror symmetry filter element generates the filtered signal, S, from exemplary projection signal P and corresponding radius, r, in accord with the mathematical function $$S_i = \sum_{a=1}^{r} |P_{i+a} - P_{i-a}| \quad \text{Eq. 2a}$$

for each value of i between r and the length of the projection signal P minus r.

Alternatively, the mirror symmetry filter element can generate the filtered signal, S, in accord with the mathematical function $$S_i = \sum_{a=0}^{r-1} |P_{i+a} - P_{i-a-1}| \quad \text{Eq. 2b}$$

Those skilled in the art will appreciate that Equations 2a and 2b, while similar, produce resultant signals S which are effectively one-half pixel out of phase with one another.

With respect to Eqs. 2a and 2b, at each point i along an axis 36, the projection signal 32 value between zero and r on the left side of the point is subtracted from the value the same distance to the right of the point. An absolute value is calculated, and is added to the absolute values of the differences at the other points between zero and r. This gives an indication of how mirror symmetric the projection 32 is about point i. The same algorithm is run along the length of the projection signal 32, giving an indication of the overall symmetrical quality of the projection signal 32.

Figure 4C:
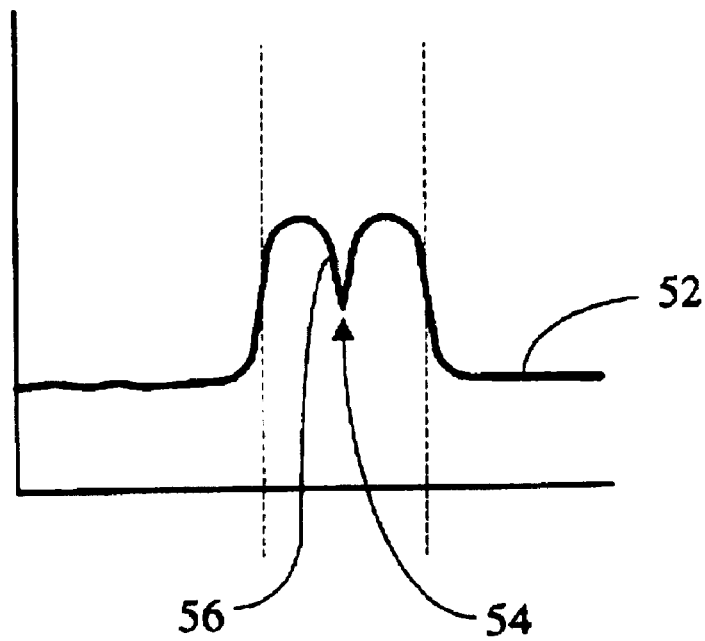
FIG. 4c is a plot of a mirror symmetry signal.

As illustrated in FIG. 4c, the mirror symmetry signal 52 is low, indicating a high degree of symmetry, in regions of approximately uniform background, e.g., at distances more than one radius away from the linear pattern 12a. Within one radius of the pattern, the value of S rises, indicating a low degree of symmetry. The signal S remains relatively high at all points within radius r of the center of the pattern, except for a very small region surrounding the exact center of the feature. This is revealed as a very sharp, downward spike 56 in signal S, whose extreme point 54 corresponds to the center of the exemplary linear pattern 12a.

The apparatus 10 performs still further processing in order to identify the location of the center of the linear pattern 12a. The goal is to distinguish the low signal value 56, corresponding to the true center of the linear pattern 12a, from the other low values corresponding to the uniform background. This is performed by notch detection element 60, which operates on the mirror symmetry signal S with a mask to generate a peak location signal L further emphasizing the peak 56.

The notch detector element 60 generates the peak location signal L in accord with the mathematical function:

$$L_i = \min\left(\frac{1}{p}\sum_{j=0}^{p-1} S_{i+j}, \frac{1}{p}\sum_{j=p+2z+n}^{2p+2z+n-1} S_{i+j}\right) - \frac{1}{n}\sum_{j=p+z}^{p+z+n-1} S_{i+j} \qquad \text{Eq. 3}$$

based on a mask, M, which can be depicted as follows:

| p | z | n | z | p |
|---|---|---|---|---|
| P | Z | N | Z | P |
| o | p | p+z | p+z+n | p+2z+n | 2p+2z+n |

In a preferred embodiment, the notch mask has a central notch one pixel wide of negative one unit amplitude. On either side of the notch, there are one pixel wide shoulders of zero amplitude. At the far ends, the shoulders notches are two pixels wide and positive one-half unit high. That is, p=2, z=1 and n=1, while P=½, Z=0 and N=−1. This preferred mask is as follows:

½ ½ 0 −1 0 ½ ½

Figure 4D:
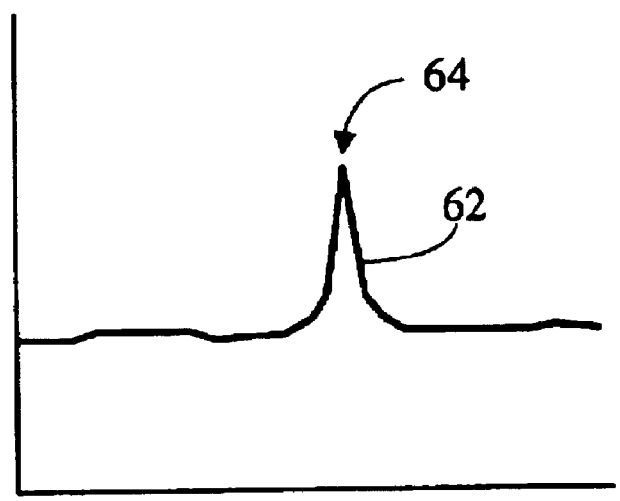
FIG. 4d is a plot of an output of a notch-detection element.

In effect, a mask of this shape represents a negative-going notch locator, filtering out all areas of the symmetry signal 52 which are low due to the uniform background. The result of the operation of this filter on the mirror symmetry signal 52 of FIG. 4c is illustrated in FIG. 4d.

The spike 62 and its peak 64 represent an accurate indication of the relative position of the center 11a of the exemplary linear pattern 12a parallel the axis 36 of interest.

In a less preferred embodiment, the function of notch detection element 60 may be performed by a laplacian filter element, which convolves the mirror symmetry signal S with a mask to generate a peak location signal L further emphasizing the peak 56.

As those skilled in the art will appreciate, convolution involves taking the "dot product" of successive overlapping windows of the mirror symmetry signal S with a pixel mask M, having elements $M_1$, $M_2$, ... $M_k$. Thus, the laplacian estimator element 60 generates the peak location signal L in accord with the mathematical function:

$$L_i = \sum_{j=1}^{k} S_{(i+j-1)} \cdot M_j \qquad \text{Eq. 4}$$

A mask for such an operation is as follows:

−¼ −¼ 0 1 0 −¼ −¼

A further refinement of the position of the peak 56 is made possible by implementing a peak location element 70 as illustrated in FIG. 1.

Figure 5:
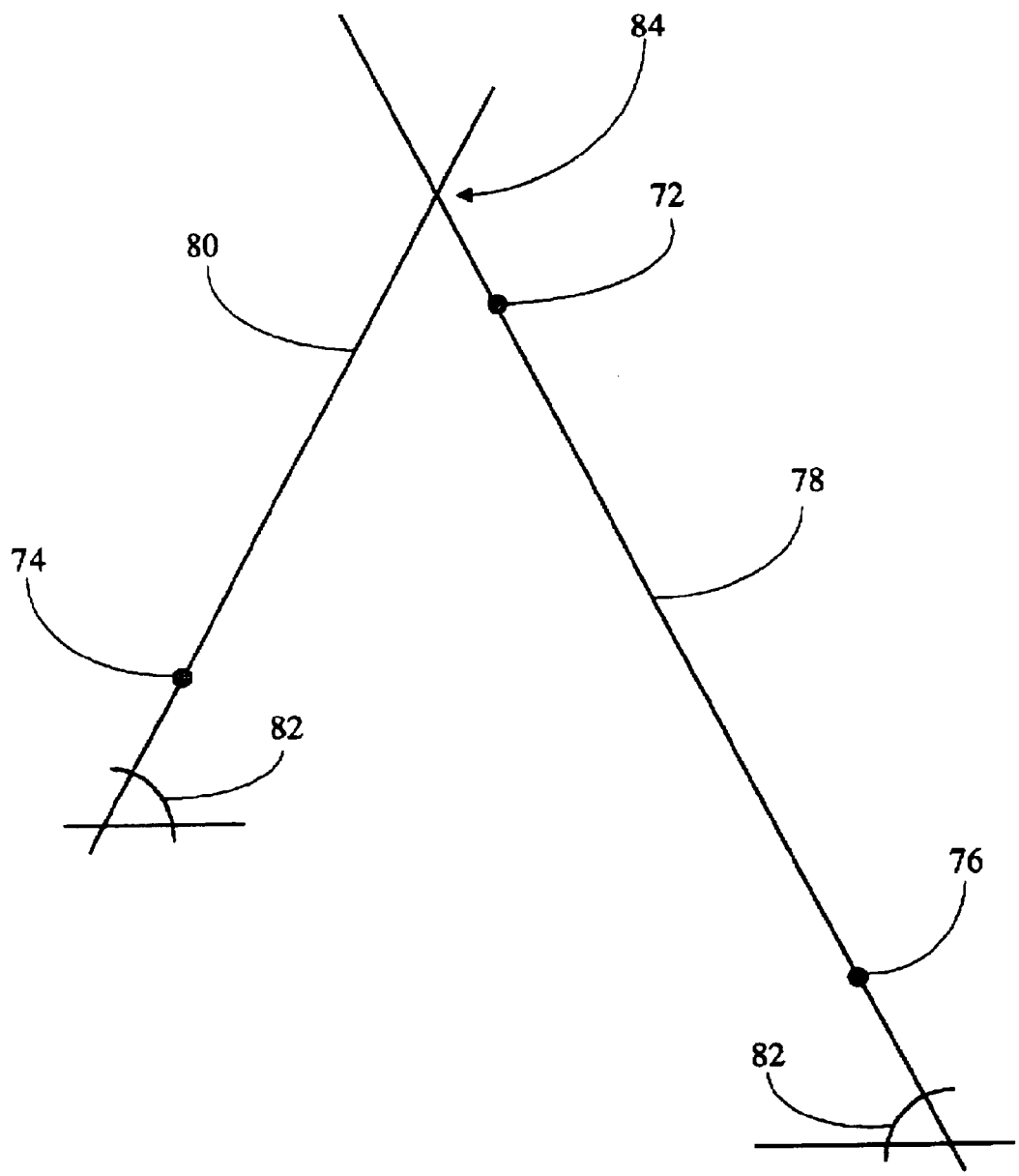
FIG. 5 is a diagram showing the function of the peak locating element.

Referring to FIG. 5, the point which has the highest amplitude in spike 62—i.e., the point representing the apparent peak of the peak location signal L—is identified as point 72. On either side of that point 72 are neighboring points 74 and 76.

In order to better determine the actual peak, and thereby the actual center of the linear pattern 12a, the peak location element 70 determines the location of a point 84 representing the intersection of lines 78 and 80. The line 78 is determined as that line which connects apparent peak 72 and lowest-value neighbor 76, while line 80 is determined as that line passing through highest-value neighbor 74 and having a slope 82 which is the negative of that of line 78, as illustrated.

The point 84 where the two line segments 78, 80 intersect is identified as a truer approximation of the center 11a of the linear pattern 12a.

In an alternative to the aforementioned method of peak detection, the processor 10 generates two mirror symmetry signals, $S_1$ and $S_2$, from each projection signal, P. The first mirror symmetry signal $S_1$ is generated according to Eq. 2a, while the second, $S_2$, is generated according to Eq. 2b. Each of the signals $S_1$, $S_2$ are then passed through notch detection element 60 to produce notch detection signals $L_1$ and $L_2$, respectively. Peak detection proceeds as described above, except insofar as apparent peak point 72 is determined by signal $L_1$, while neighboring points 74 and 76 are determined by signal $L_2$.

In order to determine the coordinates 11 of a cross-hair pattern 12, the apparatus 10 generates a projection signal Pa, Pb of the image signal I along respective axes 36a, 36b. It then uses the input radius r associated with each of those projections. The apparatus, in turn, determines a mirror symmetry signal Sa, Sb corresponding to respective ones of the projections signals Pa, Pb. And, from those mirror symmetry signals Sa, Sb, the apparatus generates peak location signals La, Lb, respectively.

Upon locating the center of the corresponding linear patterns 12a, 12b in the manner described above, the apparatus 10 generates a signal representing the center of the cross-hair 12 at the point of intersection of the two patterns 12a, 12b. That signal may be then be output to terminal 90 or positioning apparatus, not shown.

A further understanding of the invention may be attained by reference to Attachment A, filed herewith, disclosing a preferred software implementation of aspects of the invention described and claimed herein.

SUMMARY

Described above are improved machine vision methods and apparatus capable of quickly and accurately locating linear patterns, such as wafer streets or cross-hairs, on a component. Unlike the prior art, systems constructed in accord with the invention does not require an input template pattern.

Those skilled in the art will appreciate that the embodiments described above are illustrative only, and that other systems in the spirit of the teachings herein fall within the scope of the invention. Thus, for example, it will be appreciated that methods and apparatus other than that described above for mirror symmetry filtering can be used. Likewise, the invention embraces methods other than notch detection (e.g., the Laplacian technique disclosed above) for filtering the output of the mirror symmetry filter. Still further, the use of peak detection methodologies and apparatus other than, but falling within the spirit of, those described above is contemplated by the invention. Moreover, it will be appreciated that the methods and apparatus described herein can be used to identify linear patterns other than "streets" and cross-hairs.

And, of course, that systems constructed in accord with the invention have applicability outside the field of semiconductor wafer processing, Thus, for example, they can be used to locate cross-hairs in connection with graphics printing of color overlays, and in positioning components during parts assembly or inspection.

These and other such uses, as well as modifications, additions and deletions to the techniques described herein may fall within the scope of the invention, of which I claim:

1. An apparatus for identifying a linear pattern, having an expected radius less than or equal to a value r, in an image signal, I, said apparatus comprising:

A. projection means for generating a projection signal, P, representative of a projection of said image signal along an axis substantially aligned with an expected orientation of said linear pattern, where said projection signal, P, is comprised of elements $P_i$, where i is an integer between 1 and a length of said image signal along said axis, B. mirror symmetry filter means, coupled with said projection means, responsive to said radius and said projection signal for filtering that projection signal to generate a mirror symmetry signal, S, representative of the degree of symmetry of the projection signal P about each point therein, C. notch detector means, coupled with said mirror symmetry filter means, for operating on said mirror symmetry signal to generate a peak location signal emphasizing a peak corresponding to a location of a center of said linear pattern, and D. peak locating means, coupled with said notch detector means, for identifying a peak in said peak location signal, and for estimating from a location of that peak a location of a center of said linear pattern.

2. An apparatus for identifying a linear pattern, having an expected radius less than or equal to a value r, in an image signal, I, said apparatus comprising:

projection means for generating a projection signal, P, representative of a projection of said image signal along an axis substantially aligned with an expected orientation of said linear pattern, where said projection signal, P, is comprised of elements $P_i$, where i is an integer between 1 and a length of said image signal along said axis;

mirror symmetry filter means, coupled with said projection means, responsive to said radius and said projection signal for filtering that projection signal to generate a mirror symmetry signal, S, representative of the degree of symmetry of the projection signal P about each point therein;

notch detection means, coupled with said mirror symmetry filter means, for operating on said mirror symmetry signal to distinguish therein extreme values corresponding to said linear pattern from extreme values corresponding to uniform background, and to generate a peak location signal emphasizing, within the extreme values corresponding to said linear pattern, a peak corresponding to a location of a center of that linear pattern; and peak locating means, coupled with said notch detection means, for identifying a peak in said peak location signal, and for estimating from a location of that peak a location of a center of said linear pattern.

3. An apparatus for identifying a cross-hair comprising a plurality of intersecting linear patterns, having expected radii less than or equal to a value r, in an image signal, I, said apparatus comprising:

projection means for a generating, for each of said linear patterns, a corresponding projection signal, P, representative of a projection of said image signal along an axis substantially aligned with an expected orientation of that linear pattern, where said projection signal, P, is comprised of elements $P_i$, where i is an integer between 1 and a length of said image signal along the respective axis;

mirror symmetry filter means, coupled with said projection means, and responsive to said radius and each said projection signal, for filtering that projection signal to generate a corresponding mirror symmetry signal, S, representative of the degree of symmetry of the projection signal P about each point therein;

notch detection means, coupled with said mirror symmetry filter means, for operating on each said mirror symmetry signal, S, to distinguish therein extreme values corresponding to said linear pattern from extreme values corresponding to uniform background, and to generate a corresponding peak location signal emphasizing, within the extreme values corresponding to said linear pattern a peak corresponding to a location of a center of that linear pattern;

peak locating means, coupled with said notch detection means, for identifying a peak in each said peak location signal, and for estimating, from a location of that peak, a location of a center of the corresponding linear pattern; and center point locating means, coupled with said peak locating means, for determining the center of said cross-hair pattern as an intersection of the estimated locations of centers of the corresponding linear patterns.

4. An apparatus according to any of claims 2 and 3, wherein said mirror symmetry filter means includes means for filtering a projection signal to generate a mirror symmetry signal, S, comprising elements Si, wherein each element Si has a value determined in accord with the mathematical function $$S_i = \sum_{a=1}^{r} |P_{i+a} - P_{i-a}|.$$

5. An apparatus according to any of claims 2 and 3, wherein said mirror symmetry filter means includes a step for filtering a projection signal to generate a mirror symmetry signal, S, comprising elements Si, wherein each element Si has a value determined in accord with the mathematical function $$S_i = \sum_{a=0}^{r-1} |P_{i+a} - P_{i-a-1}|.$$

6. An apparatus according to any of claims 2 and 3, wherein said peak locating means includes means for identifying in said peak location signal positions and amplitudes of a most significant peak and a neighboring point on each side of that most significant peak, and for estimating from those positions and amplitudes a location of the center of said linear pattern.

7. An apparatus according to any of claims 2 and 3, wherein said peak locating means includes means for:

identifying in said peak location signal a first line intersecting a most significant peak and a neighboring value of that peak with a smallest amplitude;

determining a slope of said first line:

identifying a second line intersecting said neighboring value with a largest amplitude and having a slope complement to that of said first line:

identifying an intersection of said first and second lines, and estimating from that intersection a location of the center of said linear pattern.

8. An apparatus according to any of claims 2 and 3, wherein said projection means includes means for generating said projection signal, P, to be representative of a projection of said image signal along an axis substantially aligned with an expected orientation of said linear pattern.

9. A method for identifying a linear pattern, having an expected radius less than or equal to a value r, in an image signal, I, said method comprising:

a projection step for generating a projection signal, P, representative of a projection of said image signal along an axis substantially aligned with an expected orientation of said linear pattern, where said projection signal, P, is comprised of elements $P_i$, where i is an integer between 1 and a length of said image signal along said axis:

a mirror symmetry filter step responsive to said radius and said projection signal for filtering that projection signal to generate a mirror symmetry signal, S, representative of the degree of symmetry of the projection signal P about each point therein, a notch detection step for operating on said mirror symmetry signal to distinguish therein extreme values corresponding to the linear pattern from extreme values corresponding to uniform background and to generate a peak location signal emphasizing, within the extreme values corresponding to the linear patter, a peak corresponding to a location of a center of that linear pattern, and a peak locating step for identifying a peak in said peak location signal, and for estimating from a location of that peak a location of a center of said linear pattern.

10. A method for identifying a cross-hair comprising a plurality of intersecting linear patterns, having expected radii less than or equal to a value r, in an image signal, I, said method comprising:

a projection step for a generating, for each of said linear patterns, a corresponding projection signal, P, representative of a projection of said image signal along an axis substantially aligned with an expected orientation of that linear pattern, where said projection signal, P, is comprised of elements Pi, where i is an integer between 1 and a length of said image signal along the respective axis;

a mirror symmetry filter step for responding to said radius and each said projection signal for filtering that projection signal to generate a corresponding mirror symmetry signal, S, representative of the degree of symmetry of the projection signal P about each point therein, a notch detection step for operating on each said mirror symmetry signal to distinguish therein extreme values corresponding the linear pattern from extreme values corresponding to uniform background and to generate a corresponding peak location signal emphasizing, within the values corresponding to the linear pattern, a peak corresponding to a center of that linear pattern;

a peak locating step for identifying a peak in each said peak location signal, and for estimating from a location of that peak a location of a center of the corresponding linear pattern, and a center point locating step for determining the center of said cross-hair pattern as an intersection of the estimated locations of said linear patterns.

11. A method according to any of claims 9 and 10, wherein said mirror symmetry filter step includes a step of filtering a projection signal to generate a mirror symmetry signal, S, comprising elements Si, wherein each element Si has a value determined in accord with the mathematical function $$S_i = \sum_{a=1}^{r} |P_{i+a} - P_{i-a}|.$$

12. A method according to any of claims 9 and 10, wherein said mirror symmetry filter step includes a step for filtering a projection signal to generate a mirror symmetry signal, S, comprising elements Si, wherein each element Si has a value determined in accord with the mathematical function $$S_i = \sum_{a=0}^{r-1} |P_{i+a} - P_{i-a-1}|.$$

13. A method according to any of claims 9 and 10, wherein said peak locating step includes a step for identifying in said peak location signal positions and amplitudes of a most significant peak and a neighboring point on each side of that most significant peak, and for estimating from those positions and amplitudes a location of the center of said linear pattern.

14. A method according to any of claims 9 and 10, wherein said peak locating step includes the steps of identifying in said peak location signal a first line intersecting a most significant peak and a neighboring value of that peak with a smallest amplitude;

determining a slope of said first line;

identifying a second line intersecting said neighboring value with a largest amplitude and having a slope complement to that of said first line;

identifying an intersection of said first and second lines, and estimating from that intersection a location of the center of said linear pattern.

15. A method according to any of claims 9 and 10, wherein said projection step includes a step for generating said projection signal, P, to be representative of a projection of said image signal along an axis substantially aligned with an expected orientation of said linear pattern.

* * * * *